United States Patent
Cheng

(10) Patent No.: US 11,417,137 B2
(45) Date of Patent: Aug. 16, 2022

(54) FINGERPRINT DETECTION MODULE, ELECTRONIC DEVICE, DETECTION METHOD AND APPARATUS, AND STORAGE MEDIUM

(71) Applicant: BEIJING XIAOMI MOBILE SOFTWARE CO., LTD., Beijing (CN)

(72) Inventor: Chihjen Cheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/065,881

(22) Filed: Oct. 8, 2020

(65) Prior Publication Data
US 2021/0374380 A1 Dec. 2, 2021

(30) Foreign Application Priority Data
May 28, 2020 (CN) .......................... 202010467924.8

(51) Int. Cl.
*G06V 40/13* (2022.01)
(52) U.S. Cl.
CPC .................. *G06V 40/13* (2022.01)
(58) Field of Classification Search
None
See application file for complete search history.

(56) References Cited

U.S. PATENT DOCUMENTS

| 2016/0148036 A1* | 5/2016 | Kim .................. G06K 9/00046 382/124 |
| 2016/0266695 A1* | 9/2016 | Bae ...................... G06F 3/04166 |
| 2019/0087626 A1 | 3/2019 | Wang et al. |
| 2019/0237591 A1 | 8/2019 | Cheng et al. |
| 2019/0279566 A1 | 9/2019 | Wang et al. |

OTHER PUBLICATIONS

Extended European Search Report dated May 11, 2021 in European Patent Application No. 20208976.9, 9 pages.

* cited by examiner

*Primary Examiner* — Nicholas J Lee
(74) *Attorney, Agent, or Firm* — Oblon, McClelland, Maier & Neustadt, L.L.P.

(57) ABSTRACT

The fingerprint detection module having at least one fingerprint identification component and an acquisition component. The fingerprint identification component includes a reset unit, a photosensitive unit, and a follower unit. The reset unit switches a voltage at an output end of the photosensitive unit to an initial voltage according to a reset signal. The photosensitive unit receives reflected light of a to-be-detected fingerprint and accumulates charges, outputs a first electrical signal according to a received pulse control signal at a first level, and outputs a second electrical signal according to a next received pulse control signal at the first level. The follower unit receives the first electrical signal and forms a first voltage, and receives the second electrical signal and forms a second voltage. Further, the acquisition component receives the first voltage and the second voltage, and acquires the fingerprint according to a difference between the second and first voltage.

18 Claims, 14 Drawing Sheets

FINGERPRINT DETECTION MODULE, ELECTRONIC DEVICE, DETECTION METHOD AND APPARATUS, AND STORAGE MEDIUM

CROSS-REFERENCE TO RELATED APPLICATION

This application is based on and claims priority to Chinese Patent Application No. 202010467924.8, filed on May 28, 2020, the disclosure of which is hereby incorporated by reference in its entirety.

BACKGROUND

In recent years, in-screen fmgerprint detection based on touchable display screens has gradually been a trend. The in-screen fingerprint detection refers to providing a fingerprint sensor in a display screen of a mobile terminal and implementing fingerprint detection of identity verification based on the fingerprint information acquired by touching a related area of the display screen by a user.

SUMMARY

The present disclosure relates to the technical field of fingerprint detections, including to a fingerprint detection module, an electronic device, a detection method and apparatus.

According to a first aspect of the present disclosure, a fingerprint detection module is provided, which can include at least one fingerprint identification component, and an acquisition component. The fingerprint identification component includes a reset unit, a photosensitive unit and a follower unit. The reset unit is electrically connected to an output end of the photosensitive unit, and is configured to receive a reset signal and switch a voltage at the output end of the photosensitive unit from a present voltage to an initial voltage according to the reset signal. The photosensitive unit is electrically connected to the follower unit, and is configured to receive, after the voltage at the output end of the photosensitive unit is switched to the initial voltage, a pulse control signal, and output a first electrical signal based on the pulse control signal at a first level, receive, when the received pulse control signal is at a second level, reflected light of a to-be-detected fingerprint and accumulate charges, and form a second electrical signal according to the accumulated charges and a next pulse control signal at the first level. Further, the follower unit is electrically connected to the output end of the photosensitive unit, and is configured to receive the first electrical signal and output a first voltage according to the first electrical signal, and receive the second electrical signal and output a second voltage according to the second electrical signal. Additionally, the acquisition component is electrically connected to the fingerprint identification component, and is configured to receive the first voltage and the second voltage, and acquire the to-be-detected fingerprint according to a difference between the second voltage and the first voltage.

According a second aspect of the present disclosure, an electronic device is provided, which can include a display module, including a display array composed of multiple pixel units, and the fmgerprint detection module provided by the first aspect of the embodiments of the present disclosure, a photosensitive unit of the fingerprint detection module being exposed through a gap between the pixel units. The fmgerprint detection module is configured to acquire a to-be-detected fingerprint.

According to a third aspect of the present disclosure, a fingerprint detection method is provided, which is applied to an electronic device including the fingerprint detection module provided by the first aspect of the embodiments of the present disclosure, and include that a reset signal is input to the fmgerprint detection module, the reset signal being used for switching a voltage at an output end of a photosensitive unit from a present voltage to an initial voltage. Further, after the voltage at the output end of the photosensitive unit is switched to the initial voltage, a pulse control signal at a first level is input, where after the voltage at the output end of the photosensitive unit is switched to the initial voltage, the photosensitive unit receives reflected light of a to-be-detected fingerprint and accumulates charges; and the photosensitive unit outputs a first electrical signal according to the presently received pulse control signal at the first level, the first electrical signal being used for forming a first voltage. Additionally, a pulse control signal at a second level is input, and, after the pulse control signal at the second level is input, a next pulse control signal at a first level is input, where the photosensitive unit outputs a second electrical signal according to the next received pulse control signal at the first level, the second electrical signal being used for forming a second voltage, and a difference between the second electrical signal and the first electrical signal indicates charges accumulated by the photosensitive unit between a moment at which the first electrical signal is output and a moment at which the second electrical signal is output. The to-be-detected fingerprint can be acquired according to a difference between the second voltage and the first voltage.

According a fourth aspect of the present disclosure, a detection apparatus is provided, which may include a processor and a memory storing instructions executable by the processor. The processor is configured to execute the executable instructions to perform the method provided by the third aspect of the embodiments of the present disclosure.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the related art, when the in-screen fingerprint detection is performed in the related art, the accuracy of fingerprint detection is low, and it is difficult to satisfy the user experience.

Figure 1:
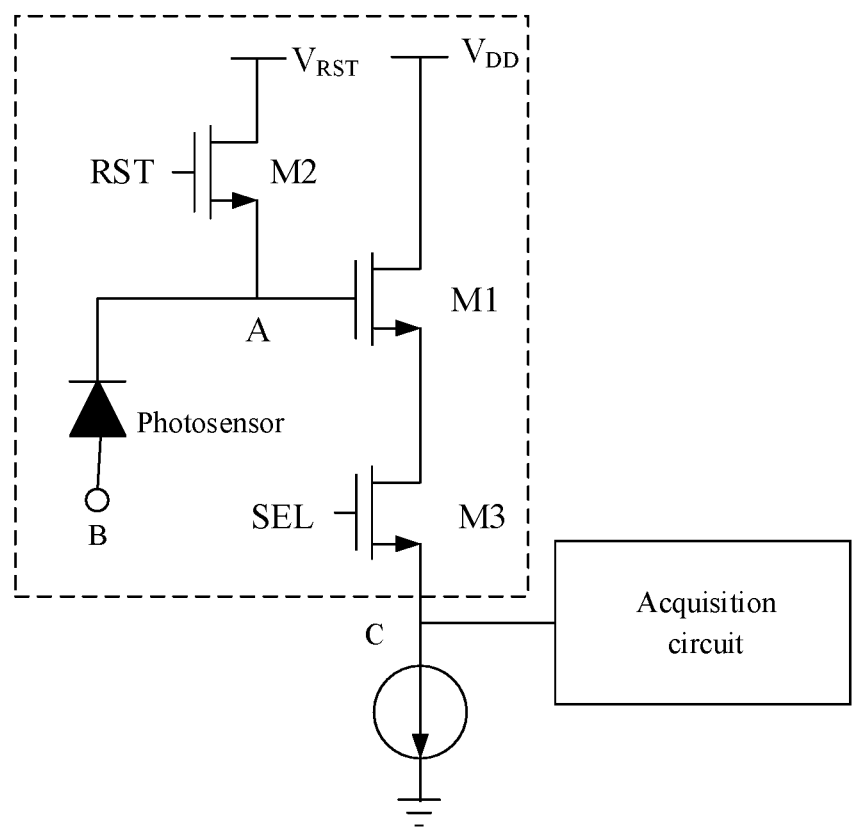
FIG. 1 is a partial circuit diagram of an active pixel sensor.

FIG. 1 is a partial circuit schematic diagram of an active pixel sensor. As illustrated in FIG. 1, the active pixel sensor includes a photosensor, a source follower transistor (M1), a reset transistor (M2), a selection transistor (M3) and an acquisition circuit.

A gate of the reset transistor is electrically connected to a reset signal line, a source of the reset transistor and an output end of the photosensor are both connected to a node A, and a drain of the reset transistor is electrically connected to a reset voltage end. The reset signal line is configured to provide a reset signal (RST). The reset voltage end is configured to provide a reset voltage ($V_{RST}$).

A gate of the source follower transistor is electrically connected to the node A, a drain of the source follower transistor is electrically connected to a power signal line, and a source of the source follower transistor is electrically connected to a drain of the selection transistor. The power signal line is configured to provide a power signal ($V_{DD}$) for the drain of the source follower transistor.

A gate of the selection transistor is electrically connected to a selection signal line, and a source of the selection transistor and the acquisition circuit are both electrically connected to a node C. The selection signal line is configured to provide a selection signal (SEL).

When the active pixel sensor illustrated in FIG. 1 works, three working phases are mainly included in sequence: a reset phase, an integration phase and a read-out phase.

During the reset phase, the reset signal is transmitted to the gate of the reset transistor through the reset signal line, to turn on the reset transistor. The reset voltage is transmitted from the drain of the reset transistor to the source of the reset transistor, such that the voltage at the output end of the photosensor is the reset voltage to turn on the source follower transistor. Moreover, the selection signal is transmitted to the selection transistor through the selection signal line to turn on the selection transistor, and a first signal is output to the acquisition circuit through the source of the selection transistor.

During the integration phase, the selection signal is stopped to be transmitted to the gate of the selection transistor to turn off the selection transistor. The reset signal is stopped to be transmitted to the reset transistor to turn off the reset transistor. The photosensor receives reflected light of a to-be-detected fingerprint, and converts the reflected light into an electrical signal and outputs the electrical signal to the node A.

During the read-out phase, the selection signal is transmitted again to the gate of the selection transistor to turn on the selection transistor. A control signal is input to the node B to turn on the photosensor. The electrical signal converted by the photosensor from the reflected light is transmitted to the gate of the source follower transistor, to turn on the source follower transistor. The selection transistor forms a second signal according to an electrical signal output by the source of the source follower transistor, and outputs the second signal to the acquisition circuit through the source of the source follower transistor. The acquisition circuit may form the to-be-detected fingerprint according to the first signal and the second signal acquired from the node C.

Although the passive pixel sensor may perform the fingerprint detection only through one transistor and one photosensor, compared with the active pixel sensor, the passive pixel sensor has larger detection noise and lower accuracy. Therefore, the active pixel sensor is generally used in the related art for fingerprint detection. Nevertheless, since the active pixel sensor has three transistors, the occupied area is larger. Due to poor transmittance of each transistor, when the active pixel sensor is disposed in a display screen for the fingerprint recognition, the effective photosensitive area of the photosensor is reduced, and the range of reflected light that can be received by the photosensor is reduced, thereby reducing the intensity of the electrical signal formed by the photosensor based on the received reflected light, resulting in a decrease in signal-to-noise ratio and reducing the accuracy of fingerprint detection.

Figure 2:
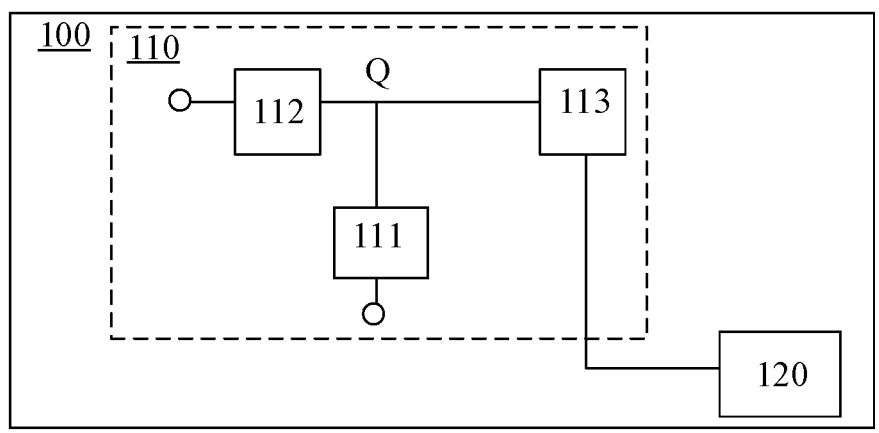
FIG. 2 is a block diagram of a fingerprint detection module according to an embodiment of the disclosure.

FIG. 2 is a schematic diagram of a fingerprint detection module 100 according to an embodiment of the disclosure. As illustrated in FIG. 2, the fingerprint detection module 100 may include at least one fingerprint identification component 110, and an acquisition component 120.

The fingerprint identification component 110 can include a reset unit 111, a photosensitive unit 112, and a follower unit 113.

The reset unit 111 is electrically connected to an output end of the photosensitive unit 112, and is configured to receive a reset signal and switch a voltage at the output end of the photosensitive unit 112 from a present voltage to an initial voltage according to the reset signal.

The photosensitive unit 112 is electrically connected to the follower unit 113, and is configured to receive, after the voltage at the output end of the photosensitive unit 112 is switched to the initial voltage, reflected light of a to-be-detected fingerprint and accumulate charges, and output a first electrical signal based on a presently received pulse control signal at a first level; and output a second electrical signal according to a next received pulse control signal at the first level, a difference between the second electrical signal and the first electrical signal indicating charges accumulated by the photosensitive unit 112 between a moment at which the first electrical signal is output and a moment at which the second electrical signal is output.

The follower unit 113 is electrically connected to the output end of the photosensitive unit 112, and is configured to receive the first electrical signal and form a first voltage according to the first electrical signal, and receive the second electrical signal and form a second voltage according to the second electrical signal.

The acquisition component 120 is electrically connected to the fingerprint identification component 110, and is configured to respectively receive the first voltage and the second voltage, and acquire the to-be-detected fingerprint according to a difference between the second voltage and the first voltage.

The reset unit 111 may be electrically connected to a reset signal line, and is configured to receive the reset signal (RST).

It is to be noted that the reset signal line may be electrically connected to a control module in an electronic device including the fingerprint detection module 100. The control module is configured to provide a reset signal for the reset unit 111 through the reset signal line. The control module is further configured to output the above pulse control signal to the photosensitive unit 112. The control module includes but not limited to a central processor or an application processor, and the like.

The reset signal may include a pulse signal having a third level and a fourth level, the third level being different from the fourth level. For example, the third level may be higher than the fourth level. With a case where the third level is higher than the fourth level for the example, when the reset signal received by the reset unit 111 is at the third level, the reset unit 111 is in an on state, such that the voltage at the output end of the photosensitive unit 112 is switched from the present voltage to the initial voltage. That is, the reset unit 111 in the on state resets the voltage at the output end of the photosensitive unit 112 as the initial voltage.

For example, one end of the reset unit 111 may be grounded. When the reset signal received by the reset unit 111 is at the third level, the reset unit 111 conducts the output end of the photosensitive unit 112 with the grounded end of the reset unit 111, such that the output end of the photosensitive unit 112 is grounded to switch the voltage at the output end of the photosensitive unit 112 from the present voltage to the initial voltage. At this time, the initial voltage may be approximate to zero.

Alternatively, one end of the reset unit 111 may be electrically connected to a power supply with a fixed voltage. The fixed voltage of the power supply is equal to the above initial voltage. When the reset signal received by the reset unit 111 is at the third level, the reset unit 111 conducts the connection between the output end of the photosensitive unit 112 and the power supply with the fixed voltage, such that the voltage at the output end of the photosensitive unit 112 is switched to the initial voltage.

When the reset signal received by the reset unit 111 is switched from the third level to the fourth level, the reset unit 111 is switched from the on state to the off state. The reset unit 111 in the off state does not reset the voltage at the output end of the photosensitive unit 112. The photosensitive unit 112 may include a photosensitive element or a photosensitive array composed of multiple photosensitive elements. The photosensitive element may include: a photosensitive diode or a photosensitive triode, etc.

The photosensitive unit 112 may include an input end, an output end and a photosensitive surface. The input end of the photosensitive unit 112 is configured to receive a pulse control signal. The output end of the photosensitive unit 112 is configured to output an electrical signal according to the pulse control signal. The photosensitive surface of the photosensitive unit 112 is configured to receive the reflected light of the to-be-detected fingerprint, and form accumulated charges according to the received reflected light. It may be understood that the amount of accumulated charges formed by the photosensitive unit 112 is positively correlated with the intensity of the received reflected light.

The reflected light formed by convex and concave portions of the fingerprint is different in intensity. As a result, the intensity of reflected light detected by the photosensitive unit 112 at different positions is also different.

It is to be noted that both the first electrical signal and the second electrical signal may be voltage signals, or both the first electrical signal and the second electrical signal may be current signals. Moreover, the signal value of the first electrical signal is different from that of the second electrical signal.

As illustrated in FIG. 2, the follower unit 113, the output end of the photosensitive unit 112 and the reset unit 111 may be all electrically connected to a node Q. The first electrical signal and the second electrical signal generated by the photosensitive unit 112 are transmitted to the follower unit 113 through the node Q.

For the same photosensitive unit 112, when intensities of the received reflected lights of the to-be-detected fingerprint are the same and durations of receiving the reflected lights are the same, the lower the photoelectric conversion efficiency of the photosensitive unit 112, the fewer the accumulated charges, and the smaller the difference between the second voltage and the first voltage.

When values of first voltage and the second voltage are different, and when the difference between the second voltage and the first voltage is less than or equal to a sensitivity threshold of a collection voltage of the acquisition component 120, the values of the first voltage and the second voltage read by the acquisition component 120 are the same, such that the acquisition component 120 acquires a false to-be-detected fingerprint, and therefore the accuracy of acquired the to-be-detected fingerprint is reduced.

It is to be noted that with the accumulated charges formed by the photosensitive unit 112 on the basis of induction of the received reflected light between two adjacent occurrence times of the first level, the difference between the second voltage and the first voltage is greater than the sensitivity threshold of the acquisition component 120, i.e., the acquisition component 120 can distinguish the value of the second voltage from the value of the first voltage.

Compared with the active pixel sensor circuit in which the output of each of the first voltage and the second voltage is controlled by providing a selection transistor, the photosensitive unit provided by the embodiment of the present disclosure receives, after the voltage at the output end of the photosensitive unit is switched to the initial voltage, the reflected light of the to-be-detected fingerprint and accumulates the charges, outputs the first electrical signal when the presently received pulse control signal is at the first level, and outputs the second electrical signal based on the next received pulse control signal at the first level, so the additional selection transistor turns out to be unnecessary. Further, the follower unit can form the first voltage and the second voltage according to the first electrical signal and the second electrical signal respectively, and the acquisition component can acquire the to-be-detected fingerprint according to the difference between the second voltage and the first voltage. In this way, the structure of the fingerprint identification component 110 may be simplified while realizing fingerprint detection, which is beneficial to reducing the cost of the fingerprint detection module 100.

In addition, by reducing the row selection transistor, the region originally used for providing the row selection transistor in the fingerprint identification module may be configured to provide the photosensitive surface of the photosensitive unit, such that the area of the photosensitive unit for receiving the reflected light of the to-be-detected fingerprint is increased, and the range of the reflected light that the photosensitive unit can receive is increased, thereby improving the signal-to-noise ratio of the fingerprint detection module, and the accuracy of the acquired to-be-detected fingerprint.

Figure 3:
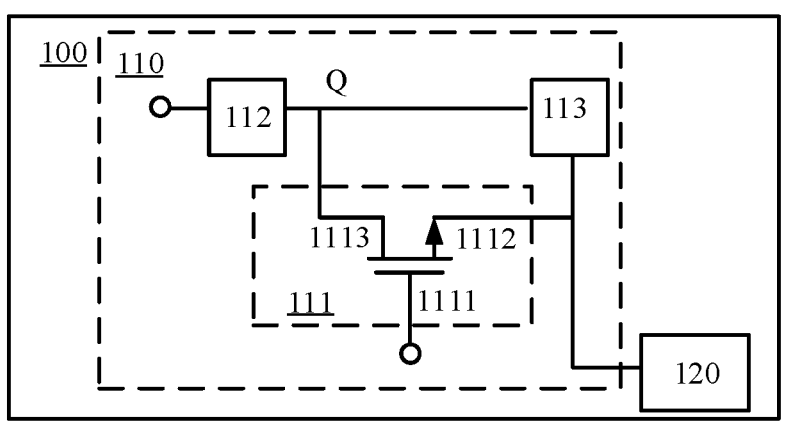
FIG. 3 is a schematic diagram of a fingerprint detection module according to an embodiment of the disclosure.

In some embodiments, as illustrated in FIG. 3, the reset unit 111 may include a reset transistor. A gate 1111 of the reset transistor is connected to a reset signal end, a source 1112 of the reset transistor is electrically connected to the acquisition component 120, and a drain 1113 of the reset transistor is electrically connected to the output end of the photosensitive unit 112, and the reset signal end is configured to provide the reset signal.

When a voltage at which the reset signal end provides the reset signal for the gate 1111 of the reset transistor is greater than a first threshold voltage ($V_{th}$) of the reset transistor, the reset transistor is turned on, and the reset unit 111 is in the on state, to switch the voltage at the output end of the photosensitive unit 112 from the present voltage to the initial voltage. Herein, the first threshold voltage is a minimum voltage that is required to input to the gate 1111 of the reset transistor when the reset transistor is turned on. For example, the first threshold voltage may be 0.7 V or 0.8 V or the like.

When the voltage at which the reset signal end provides the reset signal for the gate 1111 of the reset transistor is less than the first threshold voltage of the reset transistor, the reset transistor is turned off, and the reset unit 111 is in the off state.

In the embodiment of the present disclosure, the function of the reset unit 111 is implemented by means of one reset transistor, which is highly compatible with the related art. In this way, the area where the photosensitive unit 112 can receive the reflected light of the to-be-detected fingerprint is not reduced without increasing the area of the fingerprint detection module 100.

Figure 4:
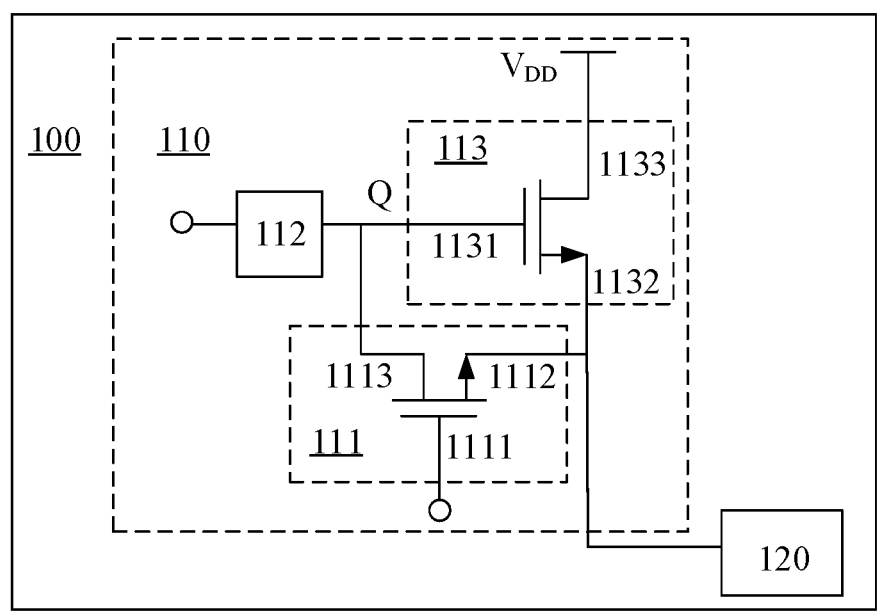
FIG. 4 is a schematic diagram of another fmgerprint detection module according to an embodiment of the disclosure.

In some embodiments, as illustrated in FIG. 4, the follower unit 113 may include a follower transistor. A gate 1131 of the follower transistor is electrically connected to the output end of the photosensitive unit 112, a source 1132 of the follower transistor is electrically connected to the acquisition component 120, and a drain 1133 of the follower transistor is connected to a power supply.

When the photosensitive unit 112 outputs the first electrical signal or the second electrical signal, the first electrical signal or the second electrical signal is transmitted to the gate 1131 of the follower transistor. It is to be noted that both the first electrical signal and the second electrical signal can make the voltage at the gate 1131 of the follower transistor greater than a second threshold voltage of the follower transistor. The second threshold voltage is a minimum voltage that needs to be input to the gate 1131 of the follower transistor when the follower transistor is turned on and the follower transistor works in a saturation region. For example, the second threshold voltage may be 0.7 V or 0.8 V or the like.

That is, when the gate 1131 of the follower transistor receives the first electrical signal or the second electrical signal, the follower transistor is turned on, and the follower unit 113 is in the on state. The follower transistor may output the first voltage from the source 1132 according to the first electrical signal received by the gate 1131, and the follower transistor may further output the second voltage from the source 1132 according to the second electrical signal received by the gate 1131.

It is to be noted that when the voltage at the output end of the photosensitive unit 112 is the initial voltage, the initial voltage is less than the second threshold voltage of the follower transistor in the follower unit, i.e., the initial voltage cannot turn on the follower transistor. Therefore, when the voltage at the output end of the photosensitive unit 112 is the initial voltage, the follower transistor is turned off, and the follower unit 113 is in the off state.

The follower transistor may be a source follower transistor. Specifically, when the follower transistor is turned on, the output voltage of the source 1132 of the follower transistor may be linearly correlated with the input voltage of the gate 1131 of the follower transistor. When the input voltage of the gate 1131 of the follower transistor changes, a ratio of a variation of the output voltage of the source 1132 of the follower transistor to a variation of the input voltage of the gate 1131 of the follower transistor is a fixed value. For example, the fixed value may be 1.

It may be understood that compared with the active pixel sensor which needs three transistors illustrated in FIG. 1, the fingerprint identification component 110 provided by the embodiment of the present disclosure includes two transistors, and the third transistor is unnecessarily provided, such that the number of transistors in the fingerprint identification component 110 is reduced, thereby reducing the occupied area and cost of the fingerprint detection module 100.

In addition, in the embodiment of the present disclosure, the region for providing the third transistor in FIG. 1 may be used for providing the photosensitive surface of the photosensitive unit 112, such that the photosensitive area of the photosensitive unit 112 is increased, the amount of accumulated charges formed by the photosensitive unit 112 based on the received reflected light is improved, the intensity of signal generated by the photosensitive unit 112 is improved, and the accuracy of the to-be-detected fingerprint acquired by the fingerprint detection module 100 is improved.

Figure 5:
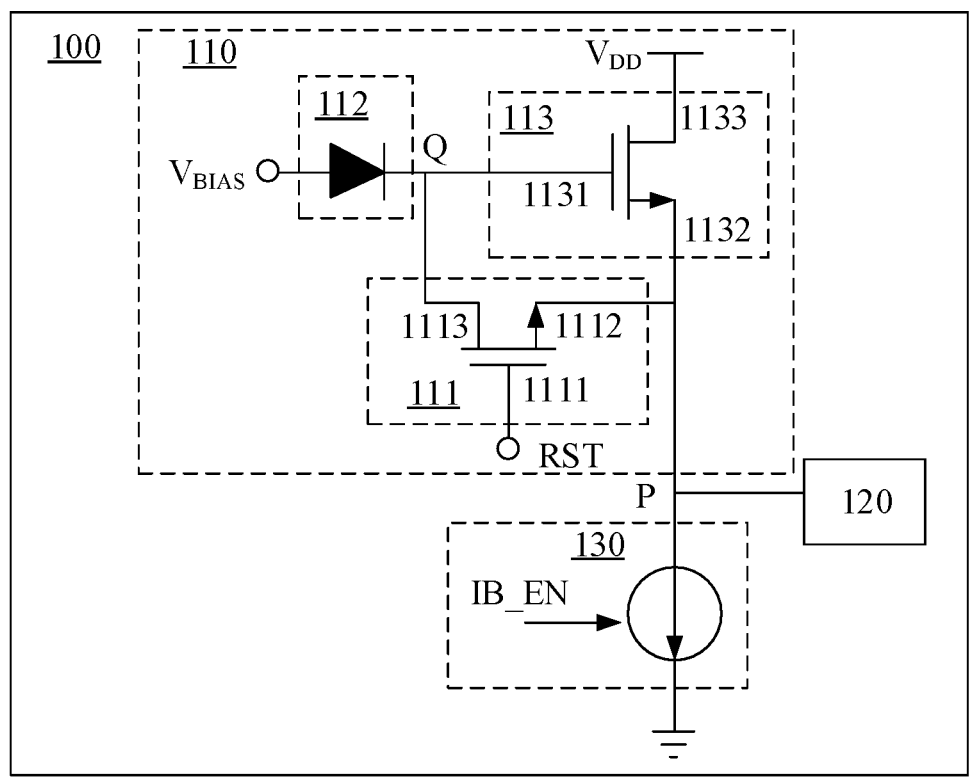
FIG. 5 is a schematic diagram of still another fingerprint detection module according to an embodiment of the disclosure.

In some embodiments, as illustrated in FIG. 5, the fingerprint detection module 100 may further include a bias power supply 130. An anode of the bias power supply 130 is electrically connected to the acquisition component 120, and a cathode of the bias power supply 130 is grounded. The bias power supply 130 has an on state and an off state. The bias power supply 130 may include a current source or a voltage source.

With a case where the bias power supply 130 is the current source as the example, when the bias power supply 130 is in the on state, the bias power supply 130 may provide a bias current. The bias current is configured to rise an anode voltage of the bias power supply, such that the anode voltage of the bias power supply 130 gradually rises to be equal to the output voltage at the source of the follower transistor.

It is to be noted that the anode of the bias power supply 130 is electrically connected to a junction between the source 1132 of the follower transistor and the acquisition component 120. As a result, when the source 1132 of the follower transistor outputs the first voltage or the second voltage, the anode voltage of the bias power supply 130 is equal to the output voltage at the source 1132 of the follower transistor.

When the bias power supply 130 is in the off state, the bias power supply 130 does not provide the bias current or the provided bias current is 0. At this time, the anode voltage of the bias power supply 130 is 0.

Figure 6:
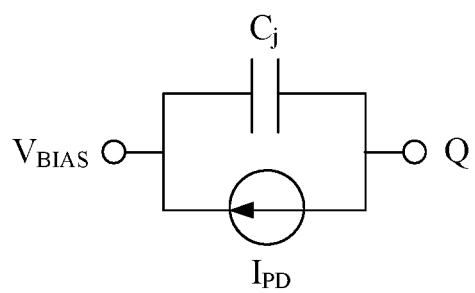
FIG. 6 is a schematic diagram of a simplified model of a photosensitive unit according to an embodiment of the disclosure.

With the photosensitive unit 112 being a photosensitive diode as the example, FIG. 6 is a schematic diagram of a simplified model of a photosensitive unit 112 shown in FIG. 5. As illustrated in FIG. 6, the photosensitive diode may be viewed as that a preset capacitor ($C_j$) and a preset current source ($I_{PD}$) are in parallel connection. A node where a first plate of the preset capacitor and a cathode of the preset current source are connected in parallel serves as an input end of the photosensitive unit 112, and a node where a second plate of the preset capacitor and an anode of the preset current source are in parallel connection serves as an output end of the photosensitive unit 112.

When the pulse control signal received by the photosensitive diode is at the second level, the photosensitive diode is turned off, and the photosensitive diode receives the reflected light of the to-be-detected fingerprint and accumulates the charges. The accumulated charges are distributed on the first plate and the second plate of the preset capacitor. The charges distributed on the second plate may lead to the rise of the voltage at the node Q.

It may be understood that the first plate and the second plate of the preset capacitor have the same amount of charges, and the charges distributed on the first plate of the preset capacitor is opposite to the charges distributed on the second plate of the preset capacitor. For example, negative charges may be distributed on the first plate, and positive charges may be distributed on the second plate.

Figure 7:
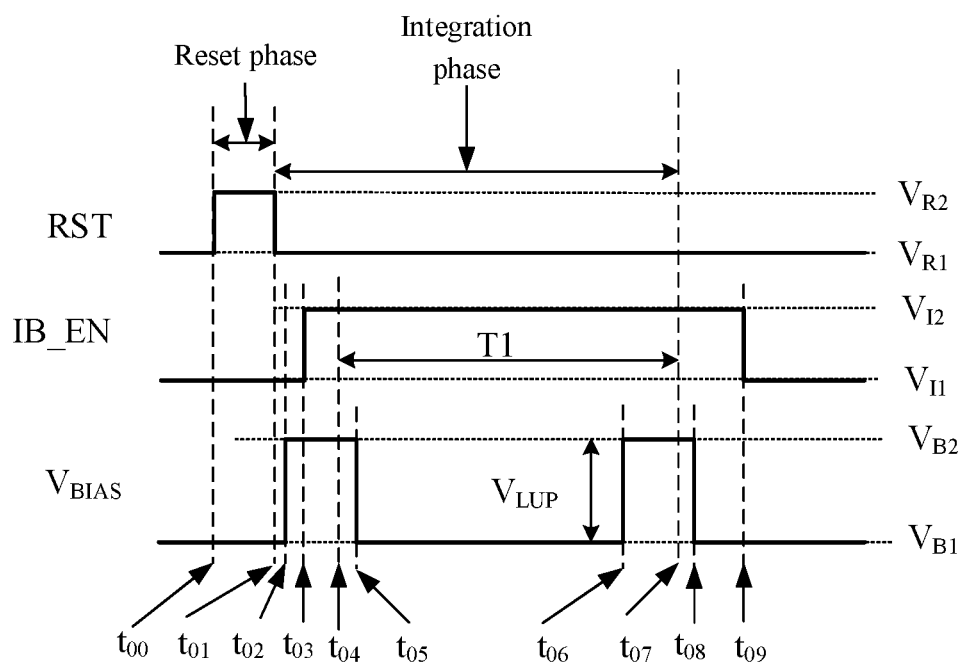
FIG. 7 is an operating timing diagram of a fingerprint detection module according to an embodiment of the disclosure.

FIG. 7 is an operating timing diagram of a fingerprint detection module 100 illustrated in FIG. 5. As illustrated in FIG. 5 and FIG. 7, the photosensitive unit 112 is the photosensitive diode, the $V_{BIAS}$ denotes the level of the pulse control signal, the unit of the $V_{BIAS}$ may be volt, the pulse control signal has the first level ($V_{B2}$) and the second level ($V_{B1}$), and the first level is higher than the second level. The RST denotes the reset signal provided by the reset signal end, the reset signal has the third level ($V_{R2}$) and the fourth level ($V_{R1}$), and the third level is higher than the fourth level. The $V_{DD}$ denotes the power signal provided by the power supply for the drain 1133 of the follower transistor. The bias power supply 130 is the current source, the IB_EN denotes a signal value of a power control signal of the bias power supply 130, the power control signal has the first signal value ($V_{f2}$) and the second signal value ($V_{f1}$), and the first signal value is greater than the second signal value. The fingerprint detection module 100 may include a reset phase and an integration phase.

Specifically, during the reset phase, the reset signal at the third level is input to the gate 1111 of the reset transistor at the moment $t_{00}$, and the reset transistor is turned on in response to the reset signal at the third level; and the power control signal has the second signal value, and the bias power supply 130 is in the off state in response to the power control signal having the second signal value. When the reset transistor is turned on, the output end (i.e., the node Q) of the photosensitive diode is electrically connected to the acquisition component 120 through the drain 1113 of the reset transistor and the source 1112 of the reset transistor, to switch the voltage at the output end of the photosensitive diode from the present voltage to the initial voltage. It is to be noted that, during the reset phase, when the pulse control signal is at the second level ($V_{B1}$), the follower transistor is turned off. The acquisition component 120 may provide a fixed voltage ($V_{RST}$) to serve as the initial voltage.

At the moment $t_{01}$, the reset signal is switched from the third level to the fourth level; and in response to the reset signal at the fourth level, the reset transistor is turned off, and the fingerprint detection module 100 enters the integration phase.

During the integration phase, the photosensitive diode receives the reflected light of the to-be-detected fingerprint and accumulates the charges. After the voltage at the output end of the photosensitive diode is switched to the initial voltage, the pulse control signal at the first level ($V_{B2}$) is input to the photosensitive diode at the moment $t_{02}$, and the photosensitive diode is turned on.

Due to a very small internal resistance of the photosensitive diode, it may be considered that the voltage at the gate 1131 of the follower transistor is equal to the first level at the moment $t_{02}$. It is to be noted that the difference ($V_{LUP}$) between the first level and the second level is greater than the second threshold voltage of the follower transistor. Hence, when the pulse control signal is switched from the second level to the first level, the follower transistor may be switched from the off state to the on state, and the follower transistor works in the saturation region.

At the moment $t_{03}$, the power control signal of the bias power supply 130 is controlled to switch from the second signal value to the first signal value, thereby switching the bias power supply 130 from the off state to the on state. When the bias power supply 130 is in the on state, the bias power supply 130 gradually establishes and rises the voltage at the node P. After the input pulse control signal of the photosensitive diode is at the first level, and after the bias power supply 130 enters the on state for a period of time, the anode voltage of the bias power supply 130 is equal to the output voltage at the source 1132 of the follower transistor.

At the moment $t_{04}$, the photosensitive diode forms the first electrical signal according to the charges accumulated from the moment $t_{01}$ to the moment $t_{04}$ and the pulse control signal at the first level, and transmits the first electrical signal to the gate 1131 of the follower transistor. The acquisition component 120 reads the voltage at the node P at the moment $t_{04}$ to serve as the first voltage. That is, the fingerprint detection module 100 reads the voltage at the node P for the first time at the moment $t_{04}$. It may be understood that the follower transistor works in the saturation region at the moment $t_{04}$.

At the moment $t_{05}$, the pulse control signal is switched from the first level to the second level, such that the photosensitive diode is turned off; and then, the voltage at the output end of the photosensitive diode is lower than the second threshold voltage of the follower transistor, and the follower transistor is turned off At the moment $t_{06}$, the pulse control signal is switched from the second level to the first level, and the photosensitive diode is turned on again. It may be understood that compared with the pulse control signal at the first level input to the photosensitive diode at the moment $t_{02}$, the pulse control signal at the first level input to the photosensitive diode at the moment $t_{06}$ is a next pulse control signal at the first level. In response to the next pulse control signal at the first level, the photosensitive diode is turned on, and forms the second electrical signal according to the charges accumulated from the moment $t_{01}$ to the moment $t_{07}$ and the next pulse control signal at the first level, and transmits the second electrical signal to the gate 1131 of the follower transistor. The acquisition component 120 reads the voltage at the node P at the moment $t_{07}$ to serve as the second voltage. That is, the fingerprint detection module 100 reads the voltage at the node P for the second time at the moment $t_{07}$. The follower transistor works in the saturation region at the moment $t_{07}$.

It may be understood that the difference between the second voltage and the first voltage indicates the charges accumulated by the photosensitive diode from the moment $t_{04}$ to the moment $t_{07}$, i.e., the difference between the second voltage and the first voltage indicates the charges accumulated by the photosensitive diode within the time period T1, and the T1 is equal to the time difference between the $t_{07}$ and the $t_{04}$.

After the acquisition component 120 reads the second voltage, the pulse control signal input to the photosensitive diode may be switched from the first level to the second level at the moment $t_{08}$ to turn off the photosensitive diode. Moreover, the bias power supply 130 may be turned off to save power, for example, the power control signal may be switched from the first signal value to the second signal value at the moment $t_{09}$, to turn off the bias power supply 130.

During the integration phase, the photosensitive diode accumulates the charges based on the received reflected light, the accumulated charges rise the voltage at the node Q by the use of the preset capacitance in the simplified model of the photosensitive diode, and the voltage at the node Q changes. Hence, under the action of the accumulated charges and the pulse control signal at the first level, the follower transistor is turned on and can work in the saturation region; and the follower transistor working in the saturation region can be used as the follower device.

When the follower transistor is used as the follower device, and when the voltage at the gate of the follower transistor changes, the voltage at the source of the follower transistor may linearly change with the voltage at the gate of the follower transistor. As the output end (i.e., the node Q) of the photosensitive diode is connected to the gate of the follower transistor, and the node P is connected to the source of the follower transistor, when the follower transistor is used as the follower device, the voltage output by the source 1132 of the follower transistor at the node P may linearly change with the voltage at the node Q, and therefore, the signal collected by the photosensitive diode may be acquired by reading the voltage at the node P, thereby acquiring the to-be-detected fingerprint.

Compared with the related art where three transistors and one photosensitive diode are needed for the fingerprint detection, the fingerprint identification component 110 provided by the embodiment of the present disclosure only needs two transistors and one photosensitive diode, such that the number of transistors in the fingerprint identification component 110 is reduced, the structure of the fingerprint identification component 110 is simplified, and the cost of the fingerprint identification module 100 is reduced.

Meanwhile, the area of the photosensitive unit for receiving the reflected light of the to-be-detected fingerprint is increased, and the range of the reflected light that the photosensitive unit can receive is increased, thereby improving the signal-to-noise ratio of the fingerprint detection module 100, and the accuracy of the acquired to-be-detected fingerprint.

As illustrated in FIG. 7, from the moment $t_{05}$ to the moment $t_{06}$, the bias power supply 130 is in the on state. It may be understood that in some embodiments, the bias power supply 130 may also be in the off state from the moment $t_{05}$ to the moment $t_{06}$ to reduce the power consumption of the bias power supply 130 and save the electricity.

Exemplarily, from the moment $t_{05}$ to the moment $t_{06}$, the follower transistor is turned off, and the source 1132 of the follower transistor does not output the signal to the acquisition component 120, such that the power control signal may be switched from the first signal value to the second signal value from the moment $t_{05}$ to the moment $t_{06}$, so as to switch the bias power supply 130 from the on state to the off state to reduce the power consumption of the fingerprint detection module 100. In such a way, an effect of saving power can further be achieved.

At the moment $t_{06}$ and before the acquisition component 120 reads the second voltage, the power control signal is switched from the second signal value to the first signal value, so as to switch the bias power supply 130 from the off state to the on state; and thus, the bias power supply 130 reestablishes the voltage at the node P; and until the anode voltage of the bias power supply 130 is equal to the voltage output by the source 1132 of the follower transistor, the acquisition component 120 reads the voltage at the node P to serve as the second voltage.

Figure 8:
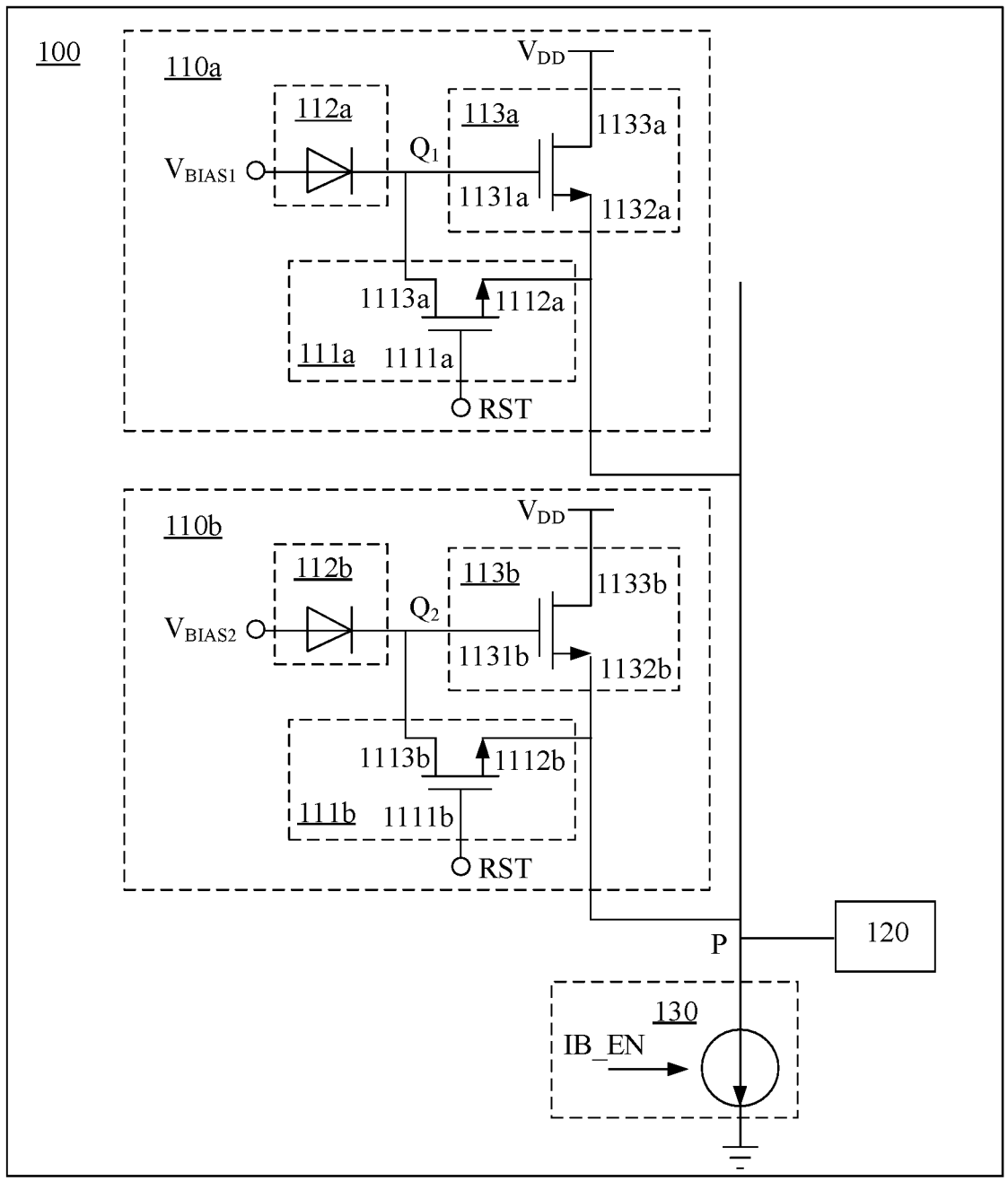
FIG. 8 is a schematic diagram of still another fingerprint detection module according to an embodiment of the disclosure.

In some embodiments, as illustrated in FIG. 8, the fingerprint detection module 100 includes multiple fingerprint identification components 110; and output ends of the follower units 113 of the multiple fingerprint identification components 110 are connected to a junction between the anode of the bias power supply 130 and the acquisition component 120 in parallel.

As illustrated in FIG. 8, a case where the fingerprint detection module 100 includes a first fingerprint identification component 110a and a second fingerprint identification component 110b, the reset unit 111 of each fingerprint identification component includes one reset transistor, and the follower unit of each fingerprint identification component includes one follower transistor is used as the example. The output end of the follower unit 113a of the first fingerprint identification component 110a serves as the source 1132a of the follower transistor 113a, the output end of the follower unit 113b of the second fingerprint identification component 110b serves as the source 1132b of the follower transistor 113b, the junction between the anode of the bias power supply 130 and the acquisition component 120 serves as the node P, and both the output end of the follower unit 113b and the output end of the follower unit 113a are electrically connected to the node P.

When the fingerprint detection module 100 includes multiple fingerprint identification components 110, by connecting the output ends of the follower units 113 of the multiple fingerprint identification components 110 in parallel to the junction between the anode of the bias power supply 130 and the acquisition component 120, the same bias power supply 130 may be used to establish the voltages of the output ends of the multiple follower units 112 through timing control, and there is no need to set different bias power supplies at the output ends of the different follower units respectively, the reuse of the bias power supply 130 is implemented, and the number of required bias power supplies 130 in the fingerprint detection module is reduced, thereby reducing the occupied area and cost of the fingerprint detection module 100.

In actual applications, the active pixel sensor may include a sensor array composed of a plurality of sensor units illustrated in the dashed box in FIG. 1.

Compared with the case where each sensor unit requires three transistors in FIG. 1, when the fingerprint identification module 100 provided by the embodiment of the present disclosure includes multiple fingerprint identification components 110, each fingerprint identification component 110 includes two transistors, and the third transistor is unnecessarily provided, such that the number of transistors in the fingerprint identification component 110 is reduced, thereby significantly reducing the occupied area and cost of the fingerprint detection module 100.

In addition, in the embodiment of the present disclosure, the region for providing the third transistor in FIG. 1 (for example, the M3 in FIG. 1) may be used for setting the photosensitive surface of the photosensitive unit 112. In this way, the photosensitive area of the photosensitive unit 112 may be increased, the amount of charges accumulated by the photosensitive unit 112 based on the received reflected light is increased, the intensity of signal generated by the photosensitive unit 112 is increased, thereby significantly improving the accuracy of the to-be-detected fingerprint acquired by the fingerprint detection module 100.

Figure 9:
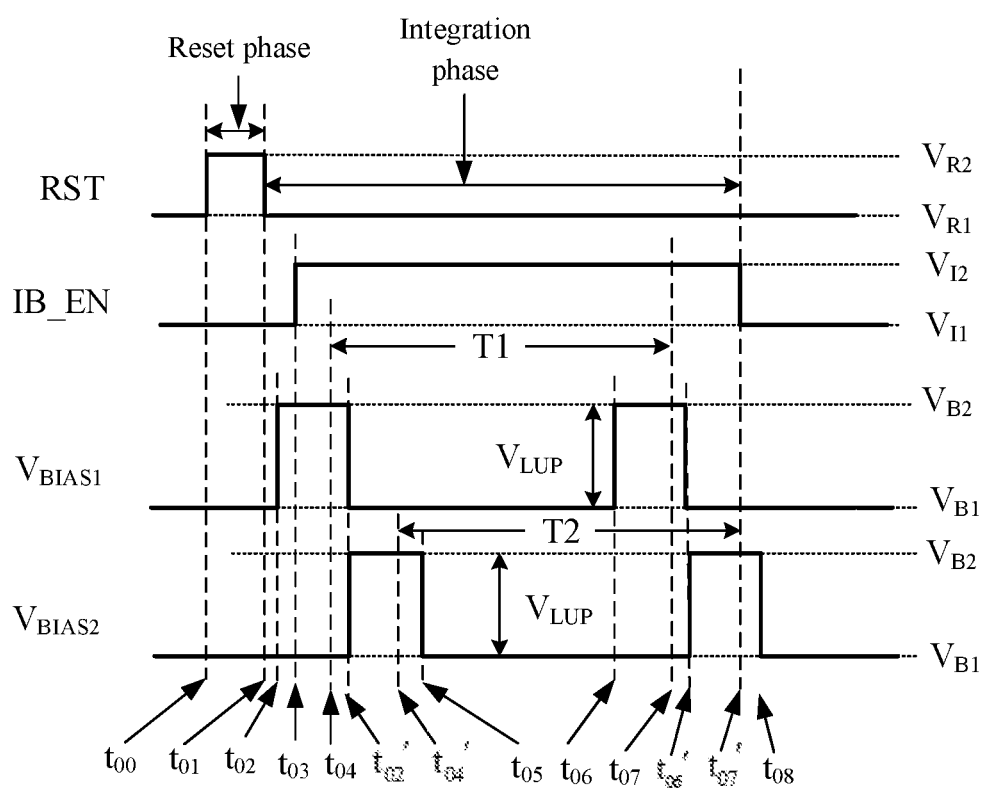
FIG. 9 is an operating timing diagram of another fingerprint detection module according to an embodiment of the disclosure.

A case where the fingerprint detection module 100 includes the first fingerprint identification component 110a and the second fingerprint identification component 110b is used as the example. FIG. 9 is an operating timing diagram of a fingerprint detection module 100 illustrated in FIG. 8.

In combination with FIG. 8 and FIG. 9, both the photosensitive unit 112a of the first fingerprint identification component 110a and the photosensitive unit 112b of the second fingerprint identification component 110b are photosensitive diodes. The $V_{BIAS1}$ denotes the level of the first pulse control signal input to the photosensitive unit 112a, the $V_{BIAS2}$ denotes the level of the second pulse control signal input to the photosensitive unit 112b, the $V_{DD}$ denotes the voltage provided by the power supply for the drain 1133a of the follower transistor of the first fingerprint identification component 110a and the drain 1133b of the follower transistor 113b of the second fingerprint identification component 110b, the bias power supply 130 is the current source, and the IB_EN denotes the power control signal for controlling the bias power supply 130.

The fingerprint detection module 100 may include a reset phase and an integration phase. Specifically, during the reset phase, the reset signal at the third level is input to the gate 1111a of the reset transistor 111a of the first fingerprint identification component 110a at the moment $t_{00}$, and the reset transistor 111a is turned on in response to the reset signal at the third level. Moreover, the power control signal at the moment $t_{00}$ has the second signal value, and the bias power supply 130 is in the off state in response to the power control signal with the second signal value. When the reset transistor 111a is turned on, the output end (i.e., the node $Q_1$) of the photosensitive diode 112a is electrically connected to the acquisition component 120 through the drain 1113a of the reset transistor 111a and the source 1112a of the reset transistor 111a, to switch the voltage at the output end of the photosensitive diode 112a from the present voltage to the initial voltage.

Furthermore, during the reset phase, the reset signal at the third level is input to the gate 1111b of the reset transistor 110b of the second fingerprint identification component 111b at the moment $t_{00}$, and the reset transistor 111b is turned on in response to the reset signal at the third level, and the output end (i.e., the node $Q_2$) of the photosensitive diode 112b is electrically connected to the acquisition component 120 through the drain 1113b of the reset transistor 111b and the source 1112b of the reset transistor 111b, to switch the voltage at the output end of the photosensitive diode 112b from the present voltage to the initial voltage.

It is to be noted that both the first pulse control signal input to the photosensitive diode 112a and the second pulse control signal input to the photosensitive diode 112b are at the second level ($V_{B1}$) during the reset phase, and both the photosensitive diode 112a and the photosensitive diode 112b are turned off; and thus, the follower transistor 113a and the follower transistor 113b are turned off The acquisition component 120 may provide a fixed voltage ($V_{RST}$) to serve as the initial voltage. Meanwhile, the gate 1111a of the reset transistor 111a and the gate 1111b of the reset transistor 111b may be electrically connected to the same reset signal line, and simultaneously receive a reset signal at the same level.

At the moment $t_{01}$, the reset signal is switched from the third level to the fourth level; and both the reset transistor 111a and the reset transistor 111b are turned off in response to the reset signal at the fourth level, and the fingerprint detection module 100 enters the integration phase.

During the integration phase, the photosensitive diode 112a and the photosensitive diode 112b receive the reflected light of the to-be-detected fingerprint and accumulate the charges. After the voltage at the output end of the photosensitive diode 112a is switched to the initial voltage, the first pulse control signal at the first level is input to the photosensitive diode 112a at the moment $t_{02}$, and the photosensitive diode 112a is turned on.

At the moment $t_{03}$, the power control signal of the bias power supply 130 is controlled to switch from the second signal value to the first signal value, thereby switching the bias power supply 130 from the off state to the on state to gradually establish and rise the voltage at the node P. After the bias power supply 130 enters the on state for a period of time, the anode voltage of the bias power supply 130 is equal to the output voltage at the source of the follower transistor 113a.

At the moment $t_{04}$, the photosensitive diode 112a forms the first electrical signal according to the charges accumulated from the moment $t_{01}$ to the moment $t_{04}$ and the first pulse control signal at the first level, and transmits the first electrical signal to the gate 1131a of the follower transistor 113a. The acquisition component 120 reads the voltage at the node P at the moment $t_{04}$ to serve as the first 'first voltage'. The follower transistor 113a works in the saturation region at the moment $t_{04}$.

It is to be noted that when the first pulse control signal at the first level is input to the photosensitive diode 112a, the second pulse control signal input to the photosensitive diode 112b is at the second level, and the photosensitive diode 112b is turned off.

After the acquisition component 120 reads the first 'first voltage', the first pulse control signal input to the photosensitive diode 112a at the moment $t_{02}'$ is switched from the first level to the second level, the second pulse control signal input to the photosensitive diode 112b is switched from the second level to the first level, and the photosensitive diode 112b is turned on.

At the moment $t_{04}'$, the photosensitive diode 112b forms the second first electrical signal according to the charges accumulated from the moment $t_{01}$ to the moment $t_{04}'$ and the second pulse control signal at the first level, and transmits the second electrical signal to the gate 1131b of the follower transistor 113b. The acquisition component 120 reads the voltage at the node P at the moment $t_{04}'$ to serve as the second first voltage. The follower transistor 113b works in the saturation region at the moment $t_{04}'$.

It may be understood that when the first pulse control signal input to the photosensitive diode 112a at the moment $t_{02}'$ is switched from the first level to the second level, the photosensitive diode 112a is turned off; and as the voltage at the output end of the photosensitive diode 112a is smaller than the second threshold voltage of the follower transistor 113a, the follower transistor 113a is turned off.

It is to be noted that the first 'first electrical signal' and the second first electrical signal may have the same value, and the first 'first voltage' and the second first voltage may also have the same value. The first level of the first pulse control signal and the first level of the second pulse control signal may have the same value, and the second level of the first pulse control signal and the second level of the second pulse control signal may have the same value. Nevertheless, the time when the first level of the first pulse control signal occurs may be different from the time when the first level of the second pulse control signal occurs.

At the moment $t_{05}$, the second pulse control signal input to the photosensitive diode 112b is switched from the first level to the second level, such that the photosensitive diode 112b is turned off. The voltage at the output end of the photosensitive diode 112b is smaller than the second threshold voltage of the follower transistor 113b, and the follower transistor 113b is turned off.

It is to be noted that during the integration phase, when the photosensitive diode 112a is turned off from the moment $t_{02}'$, the photosensitive diode 112a still receives the reflected light of the to-be-detected fingerprint and accumulates the charges. That is, from the moment $t_{02}'$, the photosensitive diode 112a still receives the reflected light of the to-be-detected fingerprint and accumulates the charges.

Similarly, during the integration phase, when the photosensitive diode 112b is turned off from the moment $t_{05}$, the photosensitive diode 112b still receives the reflected light of the to-be-detected fingerprint and accumulates the charges. That is, from the moment $t_{05}$, the photosensitive diode 112b still receives the reflected light of the to-be-detected fingerprint and accumulates the charges.

It may be understood that due to a difference between a fingerprint valley and a fingerprint ridge, different reflected lights may be generated when light emitted by a light source irradiates to a finger, such that the intensities of lights that reach different photosensitive diodes a different. Consequently, the intensity of reflected light received by different photosensitive diodes in the fingerprint detection module 100 is different, the amount of accumulated charges is also different, and this is also a case for the value of the electrical signal generated according to the accumulated charges. That is, within the same duration of the integration phase, the amount of accumulated charges of the photosensitive diode 112a is different from that of accumulated charges of the photosensitive diode 112b.

At the moment $t_{06}$, the first pulse control signal input to the photosensitive diode 112a is switched from the second level to the first level, i.e., the next first pulse control signal at the first level is input to the photosensitive diode 112a, and the photosensitive diode 112a is turned on again in response to the next first pulse control signal at the first level.

It may be understood that compared with the first pulse control signal at the first level input to the photosensitive diode 112a at the moment $t_{02}$, the first pulse control signal at the first level input to the photosensitive diode 112a at the moment $t_{06}$ is the next first pulse control signal at the first level.

Under the action of the next pulse control signal at the first level, the photosensitive diode 112a is turned on, and forms the first second electrical signal according to the charges accumulated by the photosensitive diode 112a from the moment $t_{01}$ to the moment $t_{07}$ and the next first pulse control signal with the first level, and thus the follower transistor 113a is turned on. The acquisition component 120 may read the voltage at the node P at the moment $t_{07}$ to serve as the first second voltage. The follower transistor 113a works in the saturation region at the moment $t_{07}$.

It is to be noted that when the next first pulse control signal at the first level is input to the photosensitive diode 112a, the second pulse control signal input to the photosensitive diode 112b is at the second level, and the follower transistor 113b is turned off. The follower transistor 113b has no impact on the voltage at the node P, i.e., the follower transistor 113b does not interfere the value of the first second voltage output by the follower transistor 113a.

After the acquisition component 120 reads the first second voltage, the second 'second pulse control signal' at the first level is input to the photosensitive diode 112b at the moment $t_{06}'$, the photosensitive diode 112b is turned on and forms the second 'second electrical signal' according to the charges accumulated by the photosensitive diode 112b from the moment $t_{01}$ to the moment $t_{07}'$ and the next first pulse control signal at the first level, and thus the follower transistor 113b is turned on. The acquisition component 120 reads the voltage at the node P at the moment $t_{07}'$ to serve as the second 'second voltage'. The follower transistor 113b works in the saturation region at the moment $t_{07}'$.

It is to be noted that when the second 'second pulse control signal' at the first level is input to the photosensitive diode 112b, the first pulse control signal input to the photosensitive diode 112a is at the second level, and the follower transistor 113a is turned off. The follower transistor 113a has no impact on the voltage at the node P, i.e., the follower transistor 113a does not interfere the value of the second 'second voltage' output by the follower transistor 113b. After the acquisition component 120 reads the second 'second voltage', the second pulse control signal input to the photosensitive diode 112b is switched from the first level to the second level at the moment $t_{08}$ and the photosensitive diode 112b is turned off in response to the second level of the second pulse control signal.

For the first fingerprint identification component 110a, the acquisition component 120 may determine, according to the difference between the first second voltage and the first 'first voltage', the amount of charges accumulated by the photosensitive diode 112a from the moment $t_{04}$ to the moment $t_{07}$ according to the received reflected light of the to-be-detected fingerprint, i.e., the difference between the first second voltage and the first 'first voltage' indicating the charges accumulated by the photosensitive diode 112a within the time period T1, and the T1 is equal to the time difference between the $t_{04}$ and the $t_{07}$.

For the second fingerprint identification component 110b, the acquisition component 120 may determine, according to the difference between the second 'second voltage' and the second first voltage, the amount of charges accumulated by the photosensitive diode 112b from the moment $t_{04}'$ to the moment $t_{07}'$ according to the received reflected light of the to-be-detected fingerprint, i.e., the difference between the second 'second voltage' and the second first voltage indicating the charges accumulated by the photosensitive diode 112b within the time period T2, and the T2 is equal to the time difference between the $t_{04}'$ and the $t_{07}'$. The T2 may be equal to the T1.

It may be understood that when the T1 is equal to the T2, as the amount of charges accumulated by the photosensitive diode 112a within the time period T1 may be different from that accumulated by the photosensitive diode 112b within the time period T2, the first second voltage may be different from the second 'second voltage' in value. Therefore, the difference between the first voltage and the second voltage output by each fingerprint identification component 110 may be different. The acquisition component 120 may acquire the to-be-detected fingerprint by acquiring the difference between the first voltage and the second voltage output by each fingerprint identification component 110.

As both the first fingerprint identification component 110a and the second fingerprint identification component 110b are electrically connected to the acquisition component 120 through the node P, when the source 1132a of the follower transistor 113a and the source 1132b of the follower transistor 113b simultaneously output voltages, the acquisition component 120 cannot respectively acquire to-be-detected fingerprint information collected by the first fingerprint identification component 110a and the second fingerprint identification component 110b according to the voltages at the node P.

In the present disclosure, by means of the timing control, when the first 'first voltage' and the second first voltage are read, the level of the pulse control signal input to the photosensitive diode 112a is controlled to be different from that of the pulse control signal input to the photosensitive diode 112b, such that the time of the follower transistor 113a for transmitting the first 'first voltage' to the node P and the time of the follower transistor 113b for transmitting the second first voltage to the node P are staggered, and the acquisition circuit 120 respectively acquires the first 'first voltage' output by the first fingerprint identification component 110a and the second first voltage output by the second fmgerprint identification component 110b through the same node P.

Additionally, in the present disclosure, when the first second voltage and the second 'second voltage' are read, the level of the pulse control signal input to the photosensitive diode 112a is controlled to be different from that of the pulse control signal input to the photosensitive diode 112b, such that the time of the follower transistor 113a for transmitting the first second voltage to the node P and the time of the follower transistor 113b for transmitting the second 'second voltage' to the node P are staggered, and the acquisition circuit 120 respectively acquires the first second voltage output by the first fingerprint identification component 110a and the second 'second voltage' output by the second fingerprint identification component 110b through the same node P.

Figure 10:
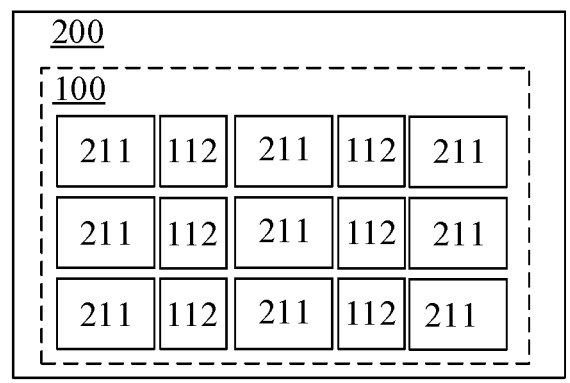
FIG. 10 is a block diagram of an electronic device according to an embodiment of the disclosure.

FIG. 10 is a schematic diagram of an electronic device 200 according to an embodiment of the disclosure. As illustrated in FIG. 10, the electronic device 200 may include: a display module, and the fingerprint detection module 100 provided by the embodiments of the present disclosure.

The display module includes a display array composed of multiple pixel units 211.

A photosensitive unit 112 of the fmgerprint detection module 100 is exposed through a gap between the pixel units 211, and the fingerprint detection module 100 is configured to acquire a to-be-detected fingerprint.

The display module may include an organic light-emitting diode (OLED) display module or a liquid crystal display (LCD) module.

When the display module includes the OLED display module, the pixel unit 211 includes an OLED.

When the display module includes the LCD module, the pixel unit 211 includes: a liquid crystal pixel unit.

As the fingerprint identification component 110 is exposed through the gap between the pixel units, compared with the related art where the active pixel sensor is disposed in the display array for the fingerprint detection, by disposing the fingerprint detection module 100 in the electronic device 200 in the embodiment of the present disclosure, an additional row selection transistor is unnecessarily provided. In a case where the gap between the pixel units is unchanged, the area for providing the photosensitive unit is increased, the range where the photosensitive unit can receive the reflected light is increased, the intensity of electrical signal generated by the photosensitive unit according to the accumulated charges is increased, thereby improving the signal-to-noise ratio and the accuracy of fingerprint detection.

Figure 11:
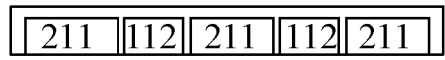
FIG. 11 is a partial schematic diagram of an electronic device according to an embodiment of the disclosure.

In some embodiments, as illustrated in FIG. 11, the photosensitive unit 112 and the pixel unit 211 are distributed on the same substrate side by side, the photosensitive unit 112 being located in a gap between at least two pixel units 211.

When the pixel unit 211 includes the OLED, the pixel unit 211 may emit the light without being backlighted.

When the display array is displayed, each pixel unit 211 has a light emitting time period and a display time slot. Exemplarily, the pixel unit 211 in the light emitting time period generates an optical signal according to a drive signal, and the pixel unit 211 in the display time slot suspends generating the optical signal.

It may be understood that the display time slot is located between adjacent two light emitting time periods of the pixel unit 211. Due to a visual persistence phenomenon, within the display time slot between the adjacent two light emitting time periods, the visual effect of the optical signal generated by the pixel unit 211 in the previous light emitting time period on a human retina is still kept in a human brain in the display time slot, i.e., the user considers that when the pixel unit 211 is displayed, the display time slot is still displayed.

Therefore, the photosensitive unit 112 may receive the reflected light of the to-be-detected fingerprint and accumulate the charges within the display time slot of the pixel unit 211, so as to reduce the influence of the light emitted from the pixel unit 211 on the amount of accumulated charges of the photosensitive unit 112, and ensuring the accuracy of the acquired to-be-detected fingerprint.

In the present disclosure, by disposing the photosensitive unit 112 and the pixel unit 211 on the same substrate, an additional substrate for supporting the photosensitive unit 112 is unnecessarily provided to reduce the thickness of the electronic device, and ensure the electronic device to be light and thin.

Figure 12:
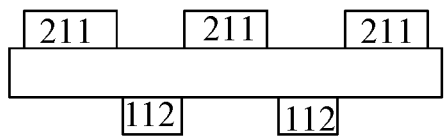
FIG. 12 is a partial schematic diagram of another electronic device according to an embodiment of the disclosure.

In some embodiment, as illustrated in FIG. 12, the photosensitive unit 112 is located on a back of a substrate where the pixel unit 211 is located, and exposed through a gap between at least two pixel units 211.

When the active pixel sensor is applied to the LCD for the fingerprint detection, the active pixel sensor may be embedded into the pixel unit on the control array substrate of the LCD (i.e., in-cell). As the reset transistor, the source follower transistor and the row selection transistor of the active pixel sensor have the very low transmittance or even are light-proof, light rays emitted from a backlight source cannot penetrate through the reset transistor, the source follower transistor and the row selection transistor to reach the liquid crystal array; and therefore, the active pixel sensor reduces the aperture ratio of the LCD module, thereby reducing the display effect of the LCD.

The fingerprint detection component provided by the embodiment of the present disclosure is unnecessarily provided with the row selection transistor, so compared with the active pixel sensor, the aperture ratio of the LCD module provided by the present disclosure may be improved, thereby improving the display effect of the LCD module.

In addition, by disposing the photosensitive unit 112 on the back of the substrate where the pixel unit 211 is located in the embodiment of the present disclosure, the manner for respectively disposing the photosensitive unit 112 and the pixel unit 211 on opposite surfaces of the substrate is simple, and has a strong compatibility than the existing process.

Figure 13:
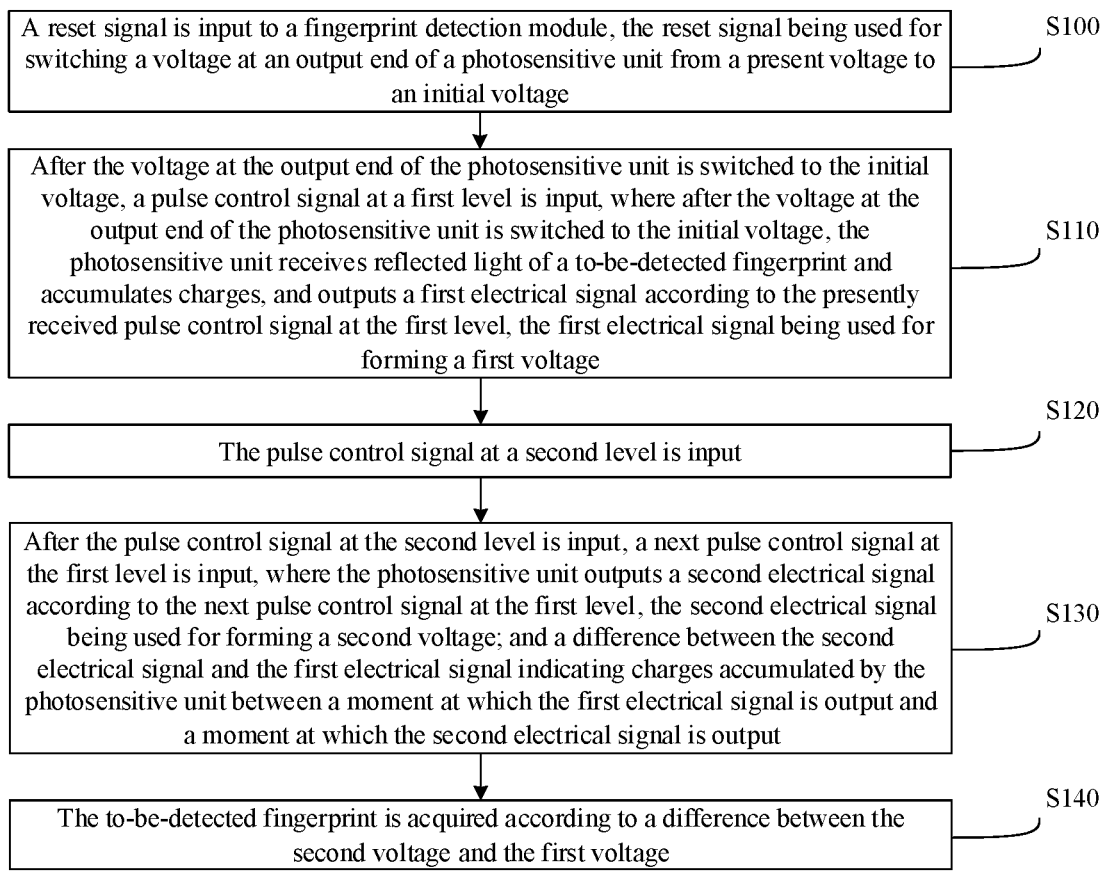
FIG. 13 is a flowchart of a fingerprint detection method according to an embodiment of the disclosure.

FIG. 13 is a flowchart of a fingerprint detection method according to an embodiment of the disclosure. The fingerprint detection method is applied to an electronic device including the fingerprint detection module 100 provided by the embodiments of the present disclosure. As illustrated in FIG. 13, the fingerprint detection method may include the following operations.

In step S100, a reset signal is input to a fingerprint detection module. The reset signal is used for switching a voltage at an output end of a photosensitive unit from a present voltage to an initial voltage.

In step S110, after the voltage at the output end of the photosensitive unit is switched to the initial voltage, a pulse control signal at a first level is input. Here, after the voltage at the output end of the photosensitive unit is switched to the initial voltage, the photosensitive unit receives reflected light of a to-be-detected fingerprint and accumulates charges, and outputs a first electrical signal according to the presently received pulse control signal at the first level, the first electrical signal being used for forming a first voltage.

In step S120, a pulse control signal at a second level is input.

In step S130, after the pulse control signal at the second level is input, a next pulse control signal at the first level is input. Here, the photosensitive unit outputs a second electrical signal according to the next received pulse control signal at the first level, the second electrical signal being used for forming a second voltage. A difference between the second electrical signal and the first electrical signal indicates charges accumulated by the photosensitive unit between a moment for outputting the first electrical signal and a moment for outputting the second electrical signal.

In step S140, the to-be-detected fingerprint is acquired according to a difference between the second voltage and the first voltage. With the photosensitive unit being a photosensitive diode as the example, in S110, the pulse control signal at the first level may be input to an input end of the photosensitive diode, such that the photosensitive diode is turned on and forms a first electrical signal. In response to the first electrical signal, the follower unit outputs the first voltage.

In step S120, after the pulse control signal input to the photosensitive diode is switched from the first level to the second level, the photosensitive diode is turned off, and the photosensitive diode receives the reflected light of the to-be-detected fingerprint and accumulates the charges.

It may be understood that when the first level of the pulse control signal in S110 is the first level that appears for the first time, the first level of the next pulse control signal in S130 may be viewed as the first level of the pulse control signal that appears for the second time.

Compared with the active pixel sensor circuit in which the output of each of the first voltage and the second voltage is controlled by providing a selection transistor, in the embodiment of the present disclosure, on the basis of the provided fingerprint detection module, by controlling a timing of the first level and the second level in the reset signal and the pulse control signal, the output of each of the first voltage and the second voltage can also be controlled without additionally providing the selection transistor, and therefore the structure of the fingerprint identification component is simplified while ensuring a fingerprint detection function, thereby reducing the cost of the fingerprint detection module.

In addition, by improving the circuit structure of the fingerprint detection module and controlling the timing, no row selection transistor is required; the area originally used for setting the row selection transistor may be used for providing the photosensitive surface of the photosensitive unit, such that the area of the photosensitive unit for receiving the reflected light of the to-be-detected fingerprint is increased, and the range of the reflected light that the photosensitive unit can receive is increased, thereby improving the signal-to-noise ratio and the accuracy of the acquired to-be-detected fingerprint.

In some embodiments, the reset unit of the fingerprint identification component includes a reset transistor, and the S100 may include the following operations.

The reset signal is input to a gate of the reset transistor to turn on the reset transistor, the reset transistor is used for switching the voltage at the output end of the photosensitive unit from the present voltage to the initial voltage.

When the voltage of the reset signal is greater than a first threshold voltage of the reset transistor, the reset transistor is turned on to switch the voltage at the output end of the photosensitive unit from the present voltage to the initial voltage. Herein, the first threshold voltage is a minimum voltage that is required to input to the gate of the reset transistor when the reset transistor is turned on. For example, the first threshold voltage may be 0.7 V or 0.8 V or the like. When the voltage of the reset signal is less than the first threshold voltage of the reset transistor, the reset transistor is turned off.

In some embodiments, the pulse control signal at the first level is used for turning on the photosensitive unit and forming the first electrical signal at the output end of the photosensitive unit, the first electrical signal is transmitted to a gate of a follower transistor, and the first electrical signal is used for turning on the follower transistor, and outputting the first voltage at a source of the follower transistor. Exemplarily, when the pulse control signal is at the second level, the follower transistor is turned off.

It is to be noted that the difference between the first level and the second level of the pulse control signal is greater than the second threshold voltage of the follower transistor. When the pulse control signal is switched from the second level to the first level, the follower transistor may be switched from the off state to the on state, and the follower transistor works in the saturation region.

In some embodiments, when the fingerprint detection module includes multiple fingerprint identification components, the fingerprint detection module includes multiple photosensitive units, and the operations illustrated in S110 may include that: after voltages at output ends of the multiple photosensitive units are switched to the initial voltage, the pulse control signal at the first level is sequentially input to the multiple photosensitive units. Here, when the pulse control signal input to one photosensitive unit among the multiple photosensitive units is at the first level, the pulse control signal input to the others is at the second level.

The operation illustrated in S120 may include that: after the pulse control signal at the first level is sequentially input to the multiple photosensitive units, the pulse control signal at the second level is sequentially input to the multiple photosensitive units.

The operations illustrated in S130 may include that: after the pulse control signal at the second level is sequentially input to the multiple photosensitive units, the next pulse control signal at the first level is sequentially input to the multiple photosensitive units. Here, when the next pulse control signal at the first level is input to one photosensitive unit among the multiple photosensitive units, the pulse control signal input to the rest photosensitive units is at the second level.

Exemplarily, when the multiple fingerprint identification components included in the fingerprint detection module are arranged side by side into a row, the pulse control signal at the first level may be input to the photosensitive unit of each fingerprint identification component according to a sequence from left to right in S110. Alternatively, the pulse control signal at the first level may be input to the photosensitive unit of each fingerprint identification component according to a sequence from right to left in S110.

When the multiple fingerprint identification components included in the fingerprint detection module are arranged side by side into a column, the pulse control signal at the first level may be input to the photosensitive unit of each fingerprint identification component according to a sequence from top to bottom in S110. Alternatively, the pulse control signal at the first level may be input to the photosensitive unit of each fingerprint identification component according to a sequence from bottom to top in S110.

When the multiple fingerprint identification components included in the fingerprint detection module are arranged side by side into an array with multiple rows and multiple columns, the pulse control signal at the first level may be input, from a first row, to the photosensitive unit of each fingerprint identification component in the first row according to a sequence from left to right in S110. After the pulse control signal at the first level is input to each photosensitive unit in the first row, the pulse control signal at the first level is sequentially input to each photosensitive unit in a second row according to the sequence from left to right. By doing so, the pulse control signal at the first level is input to each photosensitive unit row by row, until the pulse control signal is input to the photosensitive unit located at the rightmost end of the last row.

It may be understood that the next pulse control signal at the first level may be sequentially input to the multiple photosensitive units according to the sequence for inputting the pulse control signal at the first level in S110 in S130.

To sum up, in the embodiment of the present disclosure, sequentially inputting the pulse control signal to the multiple photosensitive units is to input the pulse control signal to the photosensitive units one by one according to a certain sequence without spacing or jumping some one or multiple photosensitive units.

In the embodiment of the present disclosure, after the voltage at the output end of each of the multiple photosensitive units is switched to the initial voltage, the pulse control signal at the first level is sequentially input to the multiple photosensitive units. When the pulse control signal input to one photosensitive unit is at the first level, the pulse control signal input to the remaining photosensitive units is at the second level, such that it is ensured that when the fingerprint identification component of which the input pulse control signal is at the first level outputs the first voltage, the fingerprint identification component of which the input pulse control signal is at the second level has no impact on the value of the first voltage, thereby guaranteeing the accuracy of read first voltage output by each fingerprint identification component.

Figure 14:
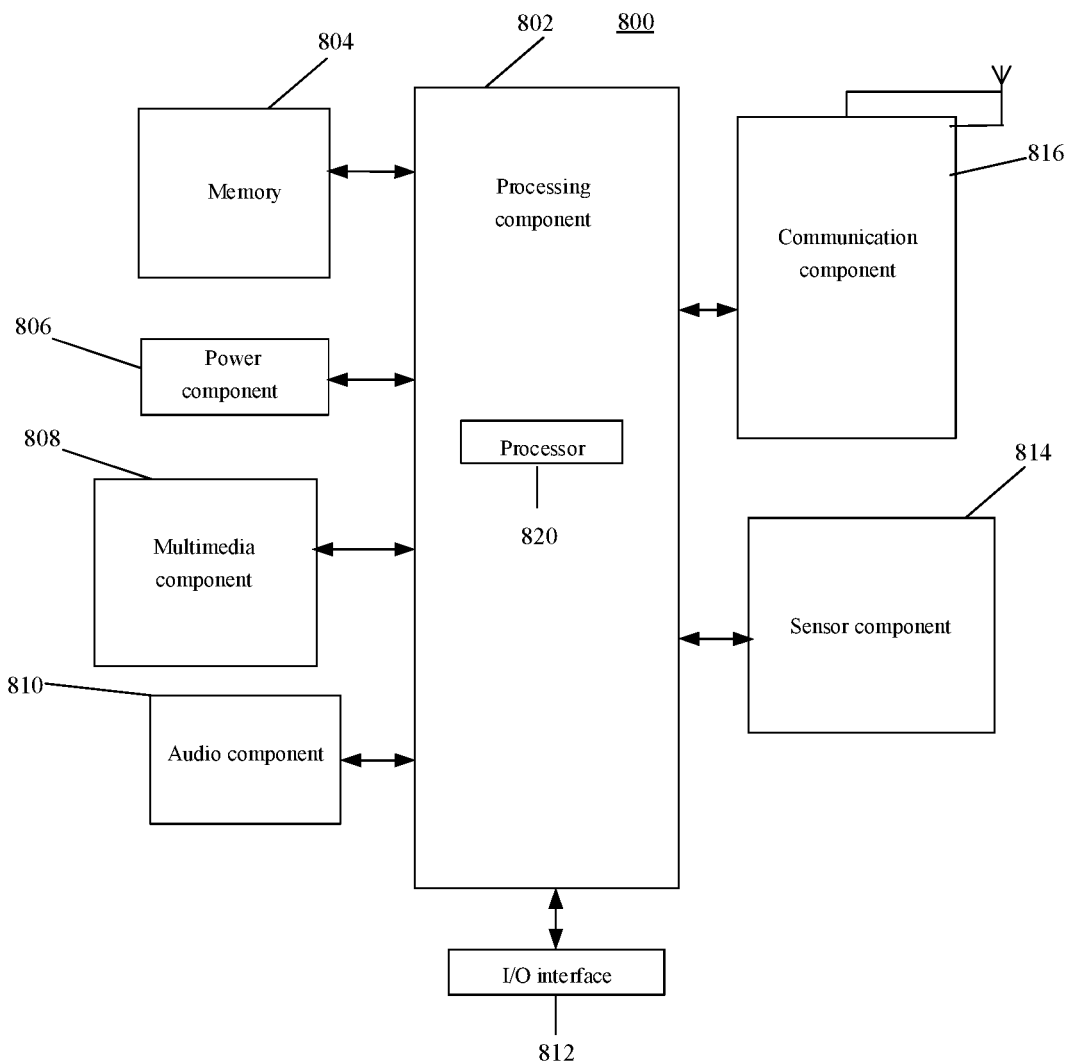
FIG. 14 is a block diagram of a fingerprint detection apparatus according to an embodiment of the disclosure.

FIG. 14 is a block diagram of a fingerprint detection apparatus 800 according to an embodiment of the disclosure.

The apparatus 800 can implement the steps of the fingerprint detection method provided by the embodiments of the present disclosure. For example, the apparatus 800 may be a mobile phone, a computer, a digital broadcast terminal, a messaging device, a gaming console, a tablet, a medical device, exercise equipment, a personal digital assistant, and the like.

As illustrated in FIG. 14, the apparatus 800 may include one or more of the following components a processing component 802, a memory 804, a power component 806, a multimedia component 808, an audio component 810, an Input/Output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented by using any type of volatile or non-transitory memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen that provides an output interface between the apparatus 800 and the user. In some embodiments, the screen may include a liquid crystal display (LCD) and a touch panel (TP). If the screen includes the touch panel, the screen may be implemented as a touch screen to receive signals input by the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive external multimedia data when the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may further be stored in the memory 804 or transmitted via the communication component 816. In some embodiments, the audio component 810 further includes a speaker configured to output audio signals.

The I/O interface 812 provides an interface between the processing component 802 and peripheral interface modules. The peripheral interface modules may be a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an on/off status of the apparatus 800 and relative positioning of components, such as a display and small keyboard of the apparatus 800, and the sensor component 814 may further detect a change in a position of the apparatus 800 or a component of the apparatus 800, presence or absence of contact between the user and the apparatus 800, orientation or acceleration/deceleration of the apparatus 800 and a change in temperature of the apparatus 800. The sensor component 814 may include a proximity sensor, configured to detect the presence of nearby objects without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 may access any communication-standard-based wireless network, such as a Wi-Fi network, a 2nd-Generation (2G) or 3rd-Generation (3G) network or a combination thereof In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASIC), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an embodiment of the disclosure, a non-transitory computer readable storage medium including instructions is further provided, for example, the memory 804 including the instructions, and the instructions may be executed by the processing component 820 of the apparatus 800 to complete the above method. For example, the non-transitory computer-readable storage medium may be a read only memory (ROM), a random access memory (RAM), a compact disc read-only memory (CD-ROM), a magnetic tape, a floppy disc, an optical data storage device, and the like.

A non-transitory computer readable storage medium is provided, and instructions in the storage medium are executed by a processor of a mobile terminal, to cause the mobile terminal to implement the steps of the fingerprint detection method provided by the embodiments of the present disclosure.

Other embodiments of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A fingerprint detection module, comprising:
   an acquisition component; and
   as least one fingerprint identification component that includes a reset unit, a photosensitive unit, and a follower unit, wherein:
   the reset unit is electrically coupled to an output end of the photosensitive unit and is configured to receive a reset signal and switch a voltage at the output end of the photosensitive unit from a present voltage to an initial voltage based on the reset signal,
   the photosensitive unit is electrically coupled to the follower unit and is configured to receive, after the voltage at the output end of the photosensitive unit is switched to the initial voltage, reflected light of a to-be-detected fingerprint and accumulates charges, output a first electrical signal based on a presently received pulse control signal at a first level, and output a second electrical signal according to a next received pulse control signal at the first level, where a difference between the second electrical signal and the first electrical signal indicates charges accumulated by the photosensitive unit between a moment at which the first electrical signal is output and a moment at which the second electrical signal is output,
   the follower unit is electrically connected to the output end of the photosensitive unit and is configured to receive the first electrical signal and form a first voltage according to the first electrical signal, and receive the second electrical signal and form a second voltage according to the second electrical signal, and
   the acquisition component is electrically connected to the fingerprint identification component and is configured to receive the first voltage and the second voltage from the follower and acquire the to-be-detected fingerprint according to a difference between the second voltage and the first voltage,
   wherein the fingerprint detection module further comprises: a bias power supply having an anode that is electrically coupled to the acquisition component and a cathode that is grounded; and
   wherein the fingerprint detection module further comprises a plurality of fingerprint identification components, output ends of follower units of the plurality of fingerprint identification components being connected in parallel to a junction between the anode of the bias power supply and the acquisition component.

2. The fingerprint detection module of claim 1, wherein the reset unit further comprises:
a reset transistor having a gate that is electrically coupled to a reset signal end, a source that is electrically coupled to the acquisition component, and a drain that is electrically coupled to the output end of the photosensitive unit, where the reset signal end is configured to provide the reset signal.

3. The fingerprint detection module of claim 2, wherein the follower unit further comprises:
a follower transistor having a gate that is electrically coupled to the output end of the photosensitive unit, a source that is electrically coupled to the acquisition component, and a drain that is electrically coupled to a power supply.

4. An electronic device, comprising:
a display module having a display array composed of a plurality of pixel units; and
the fingerprint detection module of claim 1,
wherein a photosensitive unit of the fingerprint detection module is exposed through a gap between the pixel units, and the fingerprint detection module is configured to acquire a to-be-detected fingerprint.

5. The electronic device of claim 4, wherein
the photosensitive unit and the pixel units are distributed side by side on the same substrate, so that the photosensitive unit is located in a gap between at least two pixel units.

6. The electronic device of claim 4, wherein
the photosensitive unit is located on a back of a substrate where the pixel units are located and is exposed through a gap between at least two pixel units.

7. A fingerprint detection method, applied to an electronic device comprising the fingerprint detection module of claim 1, the method comprising:
inputting a reset signal to the fingerprint detection module, the reset signal being used for switching a voltage at an output end of the photosensitive unit from a present voltage to an initial voltage;
inputting a pulse control signal at a first level after the voltage at the output end of the photosensitive unit is switched to the initial voltage, wherein after the voltage at the output end of the photosensitive unit is switched to the initial voltage, the photosensitive unit receives reflected light of a to-be-detected fingerprint and accumulates charges, and outputs a first electrical signal according to the received pulse control signal at the first level, the first electrical signal being used for forming a first voltage by a follower unit;
inputting a pulse control signal at a second level;
after inputting the pulse control signal at the second level, inputting a next pulse control signal at the first level, wherein the photosensitive unit outputs a second electrical signal according to the next received pulse control signal at the first level, the second electrical signal being used for forming a second voltage by the follower unit, and a difference between the second electrical signal and the first electrical signal indicating charges accumulated by the photosensitive unit between a moment at which the first electrical signal is output and a moment at which the second electrical signal is output;
acquiring the to-be-detected fingerprint according to a difference between the second voltage and the first voltage output by the follower unit,
wherein when the fingerprint detection module includes a plurality of fingerprint identification components, first voltages and second voltages output by follower units of the plurality of fingerprint identification components are all inputted into the junction between the anode of the bias power supply and the acquisition component.

8. The fingerprint detection method of claim 7, wherein:
the reset unit of the fingerprint identification component includes a reset transistor, and
inputting the reset signal to the fingerprint detection module, the reset signal being used for switching the voltage at the output end of the photosensitive unit from the present voltage to the initial voltage, further comprises:
inputting the reset signal to a gate of the reset transistor to turn on the reset transistor, the reset transistor switching the voltage at the output end of the photosensitive unit from the present voltage to the initial voltage.

9. The fingerprint detection method according to claim 7, wherein
the pulse control signal at the first level is used for turning on the photosensitive unit and forming the first electrical signal at the output end of the photosensitive unit, the first electrical signal is transmitted to a gate of a follower transistor, and the first electrical signal is used for turning on the follower transistor and outputting the first voltage at a source of the follower transistor.

10. The fingerprint detection method according to claim 9, wherein the follower transistor is turned off when the pulse control signal is at the second level.

11. The fingerprint detection method according to claim 9, wherein
the accumulated charges and the next pulse control signal at the first level are used for forming the second electrical signal at the output end of the photosensitive unit, and the second electrical signal is transmitted to the gate of the follower transistor, and
the second electrical signal is used for turning on the follower transistor and forming the second voltage at the source of the follower transistor.

12. The fingerprint detection method of claim 9, wherein:
inputting the pulse control signal at the first level after the voltage at the output end of the photosensitive unit is switched to the initial voltage when the fingerprint detection module includes the plurality of fingerprint identification components, further comprises:
sequentially inputting the pulse control signal at the first level to the plurality of photosensitive units after voltages at output ends of a plurality of photosensitive units are switched to the initial voltage, wherein when the pulse control signal input to one photosensitive unit among the plurality of photosensitive units is at the first level, the pulse control signal input to the other photosensitive units is at the second level;
inputting the pulse control signal at the second level further comprises:
after sequentially inputting the pulse control signal at the first level into the plurality of photosensitive units, sequentially inputting the pulse control signal at the second level to the plurality of photosensitive units; and
inputting the next pulse control signal at the first level further comprises:
after sequentially inputting the pulse control signal at the second level to the plurality of photosensitive units, sequentially inputting the next pulse control signal at the first level to the plurality of photosensitive units, wherein when the next pulse control signal at the first level is input to one photosensitive unit among the plurality of photosensitive units, the pulse control signal input to the other photosensitive units is at the second level.

13. A detection apparatus having a processor and a memory storing instructions that, when executed by the processor, cause the processor to perform operations comprising:

inputting a reset signal to a fingerprint detection module, the reset signal being used for switching a voltage at an output end of a photosensitive unit from a present voltage to an initial voltage;

inputting a pulse control signal at a first level after the voltage at the output end of the photosensitive unit is switched to the initial voltage,wherein after the voltage at the output end of the photosensitive unit is switched to the initial voltage, the photosensitive unit receives reflected light of a to-be-detected fingerprint and accumulates charges, and outputs a first electrical signal according to the received pulse control signal at the first level, the first electrical signal being used for forming a first voltage by a follower unit;

inputting a pulse control signal at a second level;

after inputting the pulse control signal at the second level, inputting ext pulse control signal at the first level, wherein the photosensitive unit outputs a second electrical signal according to the next received pulse control signal at the first level, the second electrical signal being used for forming a second voltage by the follower unit, and a difference he the second electrical signal and the first electrical signal indicating charges accumulated by the photosensitive unit between a moment as which the first electrical signal is output and moment at which the second electrical signal is output; and acquiring the to-be-detected fingerprint according to a difference between the second voltage and the first voltage output by the follower unit, wherein when the fingerprint detection module includes a plurality of fingerprint identification components first voltages and second voltages output by follower units of the, plurality of fingerprint identification components are all inputted into the junction between the anode of the bias power supply and the acquisition component.

14. The detection apparatus according to claim 13, wherein:

a reset unit of the detection apparatus is a reset transistor, and inputting the reset signal to the fingerprint detection module, the reset signal being used for switching the voltage at the output end of the photosensitive unit from the present voltage to the initial voltage, further comprises:

inputting the reset signal to a gate of the reset transistor to turn on the reset transistor, the reset transistor switching the voltage at the output end of the photosensitive unit from the present voltage to the initial voltage.

15. The detection apparatus according to claim 13, wherein the pulse control signal at the first level is used for turning on the photosensitive unit and forming the first electrical signal at the output end of the photosensitive unit, the first electrical signal is transmitted to a gate of a follower transistor, and the first electrical signal is used for turning on the follower transistor and outputting the first voltage at a source of the follower transistor.

16. The detection apparatus according to claim 15, wherein the follower transistor is turned off when the pulse control signal is at the second level.

17. The detection apparatus according to claim 15, wherein the accumulated charges and the next pulse control signal at the first level are used for forming the second electrical signal at the output end of the photosensitive unit and the second electrical signal is transmitted to the gate of the follower transistor, and the second electrical signal is used for turning on the follower transistor and forming the second voltage at the source of the follower transistor.

18. The detection apparatus according to claim 13, when the fingerprint detection module comprises the plurality of fingerprint identification components, wherein:

inputting the pulse control signal at the first level after the voltage at the output end of the photosensitive unit is switched to the initial voltage further comprises:

sequentially inputting the pulse control signal at the first level to the plurality of photosensitive units after voltages at output ends of a plurality of photosensitive units are switched to the initial voltage, wherein when the pulse control signal input to one photosensitive unit among the plurality of photosensitive units is at the first level, the pulse control signal input to the other photosensitive units is at the second level;

inputting the pulse control signal at the second level further comprises:

sequentially inputting the pulse control signal at the second level to the plurality of photosensitive units after sequentially inputting the pulse control signal at the first level into the plurality of photosensitive units; and inputting the next pulse control signal at the first level further comprises:

sequentially inputting the next pulse control signal at the first level to the pluralit' of photosensitive units after sequentially inputting the pulse control signal at the second level to the plurality of photosensitive units, wherein when the next pulse control signal at the first level is input to one photosensitive unit among the plurality of photosensitive units, the pulse control signal input to the other photosensitive units is at the second level.

\* \* \* \* \*